Figure 1:
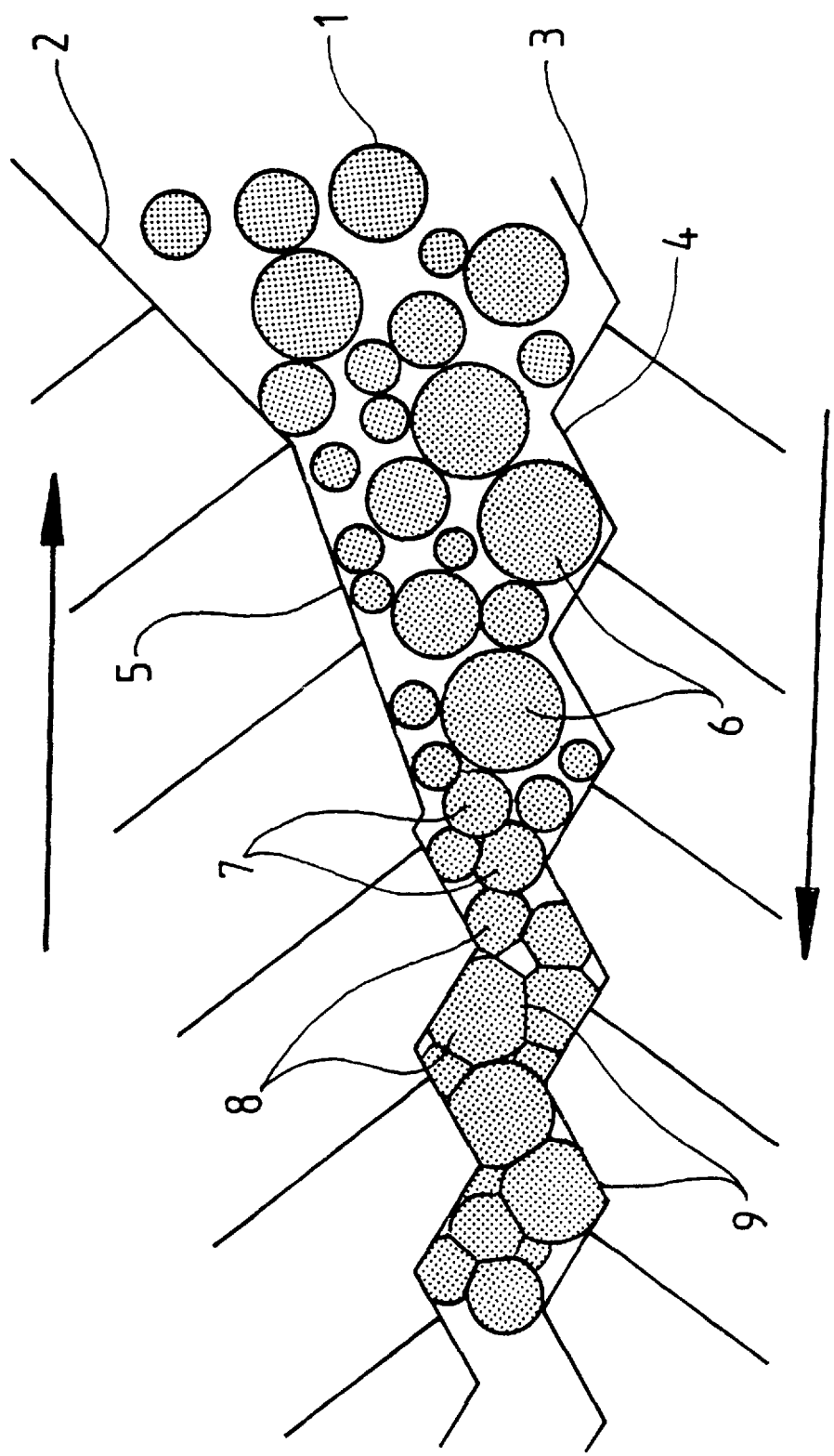

United States Patent [19]

Linzell

[11] Patent Number: 5,837,066
[45] Date of Patent: Nov. 17, 1998

[54] COMPOSITION FOR MAKING GALLED JOINT, PROCESS OF MAKING AND PROCESS OF USING COMPOSITION

[75] Inventor: Geoffrey Robert Linzell, Hatfield, England

[73] Assignee: Ball Burnishing Machine Tools Limited, Hatfield, England

[21] Appl. No.: 535,260

[22] PCT Filed: Apr. 25, 1994

[86] PCT No.: PCT/GB94/00869

§ 371 Date: Oct. 30, 1995

§ 102(e) Date: Oct. 30, 1995

[87] PCT Pub. No.: WO94/25216

PCT Pub. Date: Nov. 10, 1994

[30] Foreign Application Priority Data

Apr. 30, 1993 [GB] United Kingdom .................... 9309023

[51] Int. Cl.[6] .................................................. B23K 20/12
[52] U.S. Cl. ................................ 148/22; 29/525; 228/115
[58] Field of Search ................................ 148/22; 29/525; 228/115

[56] References Cited

U.S. PATENT DOCUMENTS 5,547,503 8/1996 Oldiges et al. ..................... 106/287.18

FOREIGN PATENT DOCUMENTS 9119589 12/1991 European Pat. Off. .
2142229 8/1971 Germany .

*Primary Examiner*—Melvyn Andrews
*Attorney, Agent, or Firm*—Synnestvedt & Lechner

[57] ABSTRACT

A composition which is effective in the making of a galled joint between two metal members in which there are gaps in the joint prior to and during its formation and which comprises a multiplicity of small metal particles and a gall-enhancing material, for example, a polydimethylsiloxane, and the use of the composition in a method of securing against lateral motion two bodies held in face to face asperity contact, thereby to make a joint between the two bodies, in which method there is inserted into the gap or interface between the two bodies said composition, which on minimal initial lateral relative motion of the two surfaces promotes rapid but controllable "galling" between the two surfaces, this galling binding the surfaces against further such motion.

20 Claims, 1 Drawing Sheet

COMPOSITION FOR MAKING GALLED JOINT, PROCESS OF MAKING AND PROCESS OF USING COMPOSITION

This invention is concerned with ways of making joints, and relates in particular to improving the joint-producing method described in International Patent Publication WO 91/19,589 (the Specification of our International Patent Application PCT/GB 91/00,950) by overcoming the problem of making reliable rubbing contacts between loose or ill-fitting parts with a clear gap between them.

In the aforementioned Patent Publication there is described and claimed a method of securing against lateral motion two bodies held in face to face asperity contact, thereby to make a join between the two bodies, in which method there is inserted into the interface between the two bodies a material—referred to hereinafter variously as an anti-lubricant, a gall enhancer, a gall-enhancing agent, a gall-promoting agent or a gall promoter—that on minimal initial lateral relative motion of the two surfaces promotes rapid but controllable "galling" between the two surfaces, this galling binding the surfaces against further such motion.

Operating experience has shown there are many uses for the abovementioned gall-enhanced friction joints, but in some applications it is either difficult, impractical or uneconomic to provide a close touching fit between the parts to be joined. This is unfortunate, for to make a satisfactory mechanical joint using the aforementioned galling method it is essential to ensure regular and predictable contacts between the two surfaces being joined, together with sufficient interfacial forces (pressure) to cause galling in the presence of a gall enhancing-agent, as the surfaces are rubbed one against the other to form the joint (for galling to happen it is believed that some plastic deformation must occur simultaneously at the contact point on at least one of the rubbing surfaces). However, there may well be considerable size—or "fit"—variation between the parts (typically made of a metal such as either a hard or a soft steel) being joined by the method. This variation commonly occurs in the size of metal parts manufactured on conventional metal-working machines with tools such as cutting bits, boring tools, drills and reamers on machines such as automatic lathes and machining centres. It is principally due to tool wear, but is also influenced by bearing wear within the machines, and by the general machine condition. It is therefore a wide-spread problem particularly in large scale mass manufacture of low cost parts on ageing equipment.

A predictable and reliable means of making good rubbing contact between the surfaces to be joined is fundamental to making good gall-enhanced mechanical friction joints between metal parts. To achieve this it is necessary to cause considerable plastic deformation of contacting asperities to reduce their height and so allow many more minor asperities to come into good rubbing contact. The problem is most acute in joining hard parts, where it is very difficult to achieve significant surface plastic deformation as a means of bringing surfaces into good face-to-face asperity contact.

Various attempts have been made to provide a noncritical way of bridging what can be a highly variable gap between the two parts of the joint. For instance, surfaces can be raised locally by impacting or indenting, so material is displaced outward and upwards around the rim of the indentation. If this is repeated systematically over a surface it raises an array of asperities to increase the effective diameter—if, for instance, it is done on the outer surface of a shaft. The raised asperities tend to bridge across the gap (to provide the needed rubbing contacts at which galling occurs), and so take up the tolerance gap. This approach has been successfully used in practice, but it lacks flexibility because it depends on deforming the asperities to achieve a fit, and there are practical limits determined by the lack of strength of the deformed asperities towards their tips.

Another solution utilised with some success is to use a metal wedge or shim that when placed between the two parts being joined exactly fills any gap between the parts and holds them firmly together in effective metal-to-metal contact through the intermediate metal wedge. The required contact pressure needed to cause galling when the surfaces are rubbed would be provided by slight elastic extension of the outer and/or compression of the inner. In practice this would mean measuring and then selecting a mating jam or shim to suit, and then individually assembling. An extension of this idea uses a tapered wedge. A further extension uses a wedge made of porous sintered construction so it will collapse under pressure so as precisely to fit the gap. However, in practice the utilisation of a wedge or shim is limited because of its high cost. There is also some potential difficulty in ensuring even galling between both faces of the jam, although this can be overcome by increasing the rubbing forces.

The present invention's proposed solution to this gap problem is to use a metal-particle-containing composition comprising the gall enhancing agent loaded with a myriad of small metal particles, which composition can be packed into the gap, and will flow to accommodate a wide range of gap sizes and also to accommodate out-of-round distortion. This use of a metal-containing composition—more specifically, a composition in the form of a paste—is quick and flexible, and able to accommodate a wide range of size variation while maintaining direct metal-to-metal contact. However, the composition must be able mechanically to lock with sufficient rigidity to produce the rubbing forces needed to initiate and maintain galling—in other words, it must convert into a virtually solid metal body by some means, irrespective of the gap width. Experiments with metal powder or flakes (like swarf) as the composition's metal component have not been especially successful, but a metal-containing composition made up from many tiny spheroids (in the size range generally from 10 to 200 microns diameter) mixed with a gall-enhancing agent works well. The composition is placed in the gap between the surfaces to be joined—the paste composition is simply smeared onto one or both surfaces to be carried into the joint; providing the paste is initially subjected only to a gentle rubbing motion it will be able to flow in the gap between the surfaces. Then, when subjected to rapid rubbing many of the metal particles will come into contact, and tend to pile up to bridge the gap. Due to previous machining marks most of the surfaces being joined will be slightly uneven, so the particles are subjected to a repeating nip action as one surface moves rapidly relative to the other. Some of the particles will rub hard against each other and the surfaces to be joined to cause local galling, so they tend rapidly to jam together to form an interlocked three-dimensional network that behaves like a virtual solid to bind, couple and therefore join the surfaces across the gap.

In one aspect, therefore, the invention provides a modification to the method of the aforementioned International Application, in which, where it is thought that the two faces to be joined might not be in good face-to-face asperity contact, so that there is a gap therebetween, there is employed to fill the gap a composition comprising a multiplicity of small metal particles surrounded by a gall-promoting material, the composition being made paste-like by the addition of a thickening agent.

As is explained in more detail hereinafter, the composition best takes the physical form of a viscous grease or paste, desirably having non-Newtonian flow characteristics, of metal particles in a "binder" of the gall promoter and including the thickening agent.

When a paste composition of the invention is new the metal particles therein move independently within the gall promoter, and roll and rub freely against each other and the surrounding surfaces while moving at low velocity under some applied force. However, they quickly seize together if subjected to rapid acceleration or to external pressure or a shock wave, providing the quantum of energy supplied is sufficient to bring the particles into firm rubbing contact one with another and/or the surrounding surfaces with sufficient force to cause plastic deformation of the particles themselves, and local galling both between the particles and the surrounding surfaces. If this happens the particles lock solid due to mechanical jamming to resist further movement, with any soft particulate components deforming to improve the packing density. If sufficient external energy is then applied in suitable form for instance, as eddy currents induced to flow between the faces being joined—diffusion bonding can occur between the deformed and jammed-together particles.

The Physical Form of the Compositions

The method of the invention involves the use of small metal particles surrounded by a gall-enhancing material. More specifically, it utilises particles which are dispersed (as the discontinuous phase) in a continuous phase made of the gall enhancer—this latter phase has the physical form of a grease or paste (conveniently quite stiff, and possibly sticky or tacky). Such a grease or paste is good for use with almost all ill-fitting joints because of the relative ease with which the composition may be applied to one or both joint surface. The adhesive properties of compositions which are sticky or tacky may be especially useful where it is necessary to hold the parts together before they galled joint is actually formed.

The Metal Particles

The method of the invention offers a number of options and variations that assist in making reliable rubbing contacts between soft/soft, hard/soft and hard/hard metal surface combinations as an aid to making improved gall-enhanced mechanical friction joints. More specifically, the metal particle composition employed may have a wide variety of different sorts of particles—different shapes, different sizes, different (hardness of) materials, as is now described.

First: the particles may be of several materials of different hardness, and with advantage may be mixtures thereof. These are typically iron and steel alloys (as disclosed in the aforementioned Patent Publication WO 91/19,589, joints gall best when like is joined to chemically like, so for most common joints between iron and steel parts the composition's metal particles should also be of a chemically-similar iron or steel alloy). If a proportion of the intermediate particles are of a hard phase such as martensite they will be hard enough to shear the surface layers off a similar hard surface (proof of this is seen in grinding hard metals, where—providing the surface speed is sufficiently high—it takes no more energy to grind hard than soft: this is thought to be due to adiabatic shear). In the process of shearing, some annealed (and therefore softer) material is likely to be exposed or deposited by galling onto the hard surface. Generally, then, for binding joints of hard materials the metal particles used should be, or include, hard ones.

Second: the particles may be of different sizes (and with advantage of mixtures thereof). A range of sizes allows the particles to pack better, so as more completely to fill the space between the two parts of the joint being made. Moreover, a size range permits some of the larger particles to become trapped in random surface marks such as tool grooves, and if these grooves have reasonably regular slopes then there are created the maximum number of random opportunities for jamming as the trapped larger particles roll up and down the slopes of the grooves. These will be rapidly reinforced by accumulations of smaller, more mobile particles. The accumulation of smaller particles into potential jamming positions is enhanced by external vibration. For maximum galling there must be a maximum number of high pressure rubbing contacts both between the particles and between the outer particles and the surfaces being joined. Such contacts occur when the packed particles lock solid, which is most likely to happen at maximum packing density—which, for spherical particles, is seen when the largest spheres make about about 87 wt % of the mixture. Second size spheres just able to lock between three contacting larger spheres need to be about 21% of the larger diameter, and comprise about 9 wt %. The third size spheres will be able to pack each side of each second size one, and will be about 20% of the latter's diameter and make up between 1 and 2 wt % (the series can continue, but with diminishing improvement on density). The estimate optimum packed blend with three sphere sizes provides a density of about 75% initially, this increasing to approaching 90% due to compression as the joint is formed. In practice, such precise size control is impractical, although experience suggests that blends can usefully be made up to 70% density before compression.

For the most part, the average gap between the two sections of a joint is likely to be between 2.5 and 50 micron, depending upon the permitted tolerance, giving peak separations of from 0 to 60 micron (and in some cases, such as a gear bore made elliptical by heat treatment distortion, to 100 micron). Where the sections are of a soft metal the gap can be bridged by jammed particles with dimensions having a maximum size of as little as 20% of the nominal average gap. For most efficient binding of hard to either soft or hard materials as many as half of the metal particles should desirably have a hardness approaching that of the hardest section, and should preferably have a dimension of at least around one half the mean gap between the sections being joined.

If in these circumstances the hardness of the particles is randomly varied, the packing and jamming behaviour will be enhanced because the hard particles will do the essential surface deformation while the intermediate and soft spheres will provide ever tighter and closer packing as they deform due to high local contact pressures. Now, if the effect of the gall-enhancing material is added to this combination, each time a sufficiently high random rubbing contact is made galling will occur, to bind the particles together—and consequently to bind the parts being joined.

During the formation of a joint, after only a minimal amount of rubbing and localised jamming, there is a high statistical probability that significant galling (followed by overall jamming and binding) will occur. And, especially in soft parts, the formed galls will randomly cause primary surface material from one or both the surfaces being joined to be heavily disrupted and drawn into the gap, ultimately substantially to bridge the gap. In the case of joining hard to hard surfaces it is unlikely that sufficient mechanical energy will be available to soften the surfaces being joined to allow the surfaces to sacrifice material in this way, so that to make an effective coupling between the hard surfaces a sufficient number of bonding bridges must be formed by an agglomeration of deformed and heavily galled particles.

The essence of making the process work is that there should be only limited rubbing, but that it must be accompanied by sufficiently high pressures to cause rapid galling. If the pressures are insufficient there is a risk of abrasive wear developing in place of galling. This will produces microscopic flakes of heavily-oxidised surface material. These flakes will, if allowed to accumulate in sufficient quantities, delay and possibly prevent satisfactory jamming. They therefore appear to deter subsequent galling in the conditions typically prevailing in a joint.

Now, there are two basic ways of forming gall-reinforced friction joints. The first is gently to position the parts to be joined (with the composition packed therebetween), and then to rotate or "twist" one rapidly against the other. The second involves forcing one part into the other, first "coating" one surface that has previously been so formed that it is able to carry the composition into the rubbing area as the parts are assembled. In the former case it is important that a high density with tight packing of particles is achieved between the faces before the joint-forming rubbing commences. In the second case the composition must be positioned so that it triggers galling as soon as possible after one part enters into the overlap area of the other.

It is interesting to note that the physical shape of the metal particles seems to be particularly important to making the process work. Trials with powdered metal in sponge form, and with metal flakes derived from chopped-up cutting swarf, did not prove particularly successful. As already mentioned, wear debris appears to slow down the process. It is thought that for maximum effectiveness the surface area of the intermediate bodies in the composition must be minimised to minimise the oxide bulk and maximise the strength and galling potential of each particle, and thus a sphere would appear to be optimum. However, it is conceivable that wedge-shaped grains or particles would be beneficial if they could be easily made. A mix of both might be best. For example, the particles might include a mixture of near spherical ones, of slightly pear-shaped ones (as commonly produced by the well-known Gas Atomisation Process), and of elongate, or rod-shaped, ones; such a mixture will have interesting and useful flow properties, and so might flow smoothly out of an applicator nozzle into an alignment that will easily permit the parts of the joint to be pushed nearly into place, but will then immediately resist, and so jam and bind, when the joint parts are give their final assembly twist or turn. Spherical, or nearly spherical, "powders" are available commercially to make the implementation of the method of the invention a practical exercise, and typical examples are those available from Kobe Steels Ltd., of Takasgo, Japan, under the names Kobelco SUS316 (a powdered stainless steel of average particle size 10 micrometer, maximum 44 micrometer) and Kobelco KPX20 (a low carbon ferritic steel powder with average diameter 100 micrometer, maximum 150 micrometer, hardness 322 Hv). Another material is that supplied by BSA Metal Powders Ltd., Birmingham, England, under the name "2604 batch G1011/14", which is a powdered T42 tool steel with 2.5% at 150 micrometer, 31% at 106 micrometer, 29% at 75 micrometer, 25% at 53 micrometer, 10% at 45 micrometer, and the balance at below 45 micrometer. Other possible materials are, as indicated above, those made by the Gas Atomisation Method, which is applicable to virtually all stainless and alloy steels, to nickel-based high temperature (nimonic) materials, and to chromium, titanium, and aluminium and its alloys.

Some of the metal powders manufactured for use in making metal injection-moulded sintered metal parts are also well suited for use in this invention. These are available with predominantly spherical particles, and are graded to restrict the range of sizes of particles to within a band. They are available in most stainless steels and ordinary steels— most of the joints made using the gall-enhanced friction method have been in steel, and it appears that in many cases austenitic stainless particles are the most useful because they appear to be well suited to galling to most other steels, both hard and soft. Furthermore, providing they are of the type with rapid work-hardening features (such as those of the 316 stainless steel series) they are able under rapid and severe deformation to deform by martensitic shear to provide very hard potential cutting surfaces, and so to provide good galling potential to hard tool and other case-hardened steels. There is also some benefit in using an austenitic material such as 316 since it is non-magnetic, and therefore makes for easier mixing when making the composition. There is a further advantage in that the corrosion risks are minimised.

The Nature of the Gall Enhancer

The compositions used in the invention comprise a particulate metal in or coated by a gall-enhancing agent. Basically, the gall-enhancing agent can be any one (or more) of the materials suggested in the aforementioned Application, especially such a material that appears to act as an oxygen scavenger when placed in contact with some types of plasticly-deforming metals. Typical of these materials are the range of polydimethylsiloxane liquids of viscosities generally up to 100 c/s (lower molecular weight volatile versions of similar siloxanes can be used where the surplus liquid naturally evaporates after the joint is formed). Examples of these are those available from Dow Corning under the designations 200/10, 200/50 and 200/100. Other useful agents are the similar siloxanes with amino active side groups; these form "tacky", adhesive-like substances when exposed to water adsorbed on the surfaces being joined, and subsequently appear to cross link, or "vulcanise", so is to form a synthetic rubber cocoon which prevents any small loose unbonded metal particles breaking loose in service. One such material is Dow Corning's 536, while others are Rhone Poulenc's 1300, 21367 and 21642. Yet other useful agents, especially for the thinning of compositions that might otherwise be too thick, are the cyclic polydimethyl siloxanes, for example Dow Corning's 345 and 344, and Rhone Poulenc's 70045 V 2 (believed to be predominately a polydimethyl cyclic tetromer).

Some other useful siloxanes with gall-promoting features have hydrogen/methyl side groups that can be chemically bonded to a metal surface. Thus, it is possible to coat the individual particle with a layer of gall-enhancing material to make possible the use of "dry" powdered metals. In this case there may be some practical advantage in using magnetised particles to get them to adhere to each other and to the surfaces to be joined. One possible polymethylhydrogen siloxane is Dow Corning's 1107, while another is Basildon Chemical's BC94/035.

Using a Thickener

Liquid compositions made using the several aforementioned siloxanes have proved effective for the purpose of allowing badly-fitting joins to be binded together (as demonstrated by the Test Result Data given hereinafter), but these liquid compositions do not always themselves exhibit satisfactory storage properties. For example, many of the liquid mixtures, even when made up using quite viscous siloxanes, do not have the physical stability necessary to prevent the metal particle component settling out in time, and thus over a shorter or a longer period the compositions tend to separate into two distinct parts. Now, while the compositions can always be re-dispersed immediately prior to use, this separation is an irritation, and a potential problem. The problem can be mitigated, however, by the use—in accordance with the invention—of additive materials to thicken the siloxane into a paste or grease with which the metal particles can be mixed to form a "suspension" having excellent long-term stability. One such category of thickeners is fumed silica, and typical fumed silica thickening agents are the Degussa AEROSIL range (especially that one sold as AEROSIL 200); in amounts of as little as 2 to 5 wt % these types of material will convert the siloxane from a relatively mobile liquid into a quite stiff paste that stably holds the metal particles yet has all the desired joint-forming properties.

The Compositions per se

The method of the invention employs a grease or paste of particulate metal dispersed in a thickened gall-enhancing material. These compositions are themselves new, with interesting and unusual properties and uses, and in a second aspect the invention provides such compositions per se.

Making the Compositions

As noted above, the compositions of the invention comprise small metal particles dispersed in a continuous phase made of the gall enhancer, and by using a thickening agent this continuous phase has the physical form of a grease or a paste.

A grease or paste composition can be made simply by admixture of the relevant ingredients (including a thickening agent).

The gap-filling joining process of the invention is now described as a basic concept, though by way of illustration only, in the accompanying diagrammatic Drawings in which FIG. 1 shows in cross section a gap between two parts being joined.

The paste (1) is placed on either of the surfaces to be joined (2) and (3), and the upper surface 2 is moved to the left and/or the lower surface 3 is moved to the right as shown by the arrows. The particles—shown for convenience as many small spheres of varying size are carried into the joint by the machine marks (4). The cut marks are shown with 30° inclines—these being accepted as average angles for a typical surface machined on a lath or boring machine. A 20° or less lead-in tapper (5) on the upper surface forms a locking angle with the cut marks on the lower surfaces, as the surfaces move relative to each other. Paste or powder particles therefore become trapped (6), and are progressively compressed (7). Rubbing between the faces being joined and the particles now becomes significant, and sufficient to cause sever galling between the surfaces and the paste and between the particles in the paste (9). Thus the gap between the the faces being joined becomes jammed with deformed and galled particles that bind the surfaces against further slippage.

Various Examples and Test Results are now given, though again by way of illustration only, to show details of the invention.

Preparation of Siloxane/Metal Particle Compositions (1) without Thickening Agent (Comparison)

By simple physical stirring and shaking, 100 grams of Kobe Steel KPX20, a metal powder with an apparent density of 4.41, was added to and mixed with 23 grams of Dow Corning DC 1107 siloxane, a volume proportion of about 50:50. The resulting mixture had a moderate paste-like consistency. It was allowed to stand, and separated into two distinct layers within 15 minutes.

With Thickening Agent (The Invention)

The same metal powder and siloxane were mixed in the same amounts, but with the addition of 1.1 grams—5 wt % based on the siloxane—of Degussa AEROSIL 200 fumed silica as a thickening agent, added to and thoroughly mixed with the siloxane before the metal powder. The latter was then mixed in until an even consistency was obtained. The resultant composition was a thick paste, and was perfectly stable on standing (no separation was observed even after many days).

Various other compositions were made from powders admixed with siloxanes, with and without the addition of a thickener. Their physical stability—their tendency to separate into two layers—is as shown in Table I below (only those with the thickener—those of Tests Nos: 11 to 14—are of the invention).

Preparation of Siloxane/Metal Particle Compositions (2)

10 parts by weight Rhone Poulenc 70045 V 2 (a polydimethyl cyclic tetramer siloxane) was thoroughly mixed with 20 parts by weight Dow Corning 536 (an aminomethoxy-functional polydimethylsiloxane). To the resultant fairly mobile liquid was added 3 parts by weight Degussa AEROSIL 200 fumed silica; this was mixed thoroughly, and the whole became a grease.

65 parts by weight BSA spherical T42 metal powder was then added, and mixed in, and finally a small amount—2 parts by weight—of extra AEROSIL 200 was added, blended in to convert the whole to a stiff paste.

This material is also shown in Table I below.

TABLE I

| Test No: | Siloxane Type:wt % | | Metal Type:wt % | | DGA 200 (thickener) wt % | Separated after | | | delta mu ($\delta\mu$) |
|---|---|---|---|---|---|---|---|---|---|
| | | | | | | 1 hour | 1 day | 1 month | |
| Comparisons | | | | | | | | | |
| 1 | DC1107 | 50 | KS-KPX20 | 50 | — | | X | | 0.53 |
| 2 | DC200/50 | " | " | " | — | | X | | 0.37 |
| 3 | DC200/100 | " | " | " | — | | X | | 0.36 |
| 4 | DC345 | " | " | " | — | | X | | 0.38 |
| 5 | DC536 | " | " | " | — | | X | | 0.42 |
| 6 | DC1107 | " | KS-SUS316 | " | — | | X | | 0.49 |
| 7 | " | 40 | " | 60 | — | | X | | 0.44 |
| 8 | " | 30 | " | 70 | — | | X | | 0.40 |
| 9 | " | 20 | " | 80 | — | | X | | 0.35 |
| 10 | " | 10 | " | 90 | — | | X | | 0.30 |
| Invention | | | | | | | | | |
| 11 | " | 50 | " | 50 | 4 | | | X | 0.39 |

TABLE I-continued

| Test No: | Siloxane Type:wt % | | Metal Type:wt % | | DGA 200 (thickener) wt % | Separated after 1 hour | 1 day | 1 month | delta mu ($\delta\mu$) |
|---|---|---|---|---|---|---|---|---|---|
| 12 | " | | KS-SUS430 | " | " | | | X | 0.39 |
| 13 | " | | KS-KPX20 | " | " | | | X | 0.40 |
| 14 | DC536 RP70045V2 | 20 10 | BSAT42 | 65 | 5 | | | X | 0.55 |

In the Table, "RP" is Rhone Poulenc, "DC" is Corning, and "DGA" is Degussa AEROSIL.

Tests for Joint-Forming Ability

The several metal particle/siloxane compositions shown above were all tested for their ability to cause galling, and thus be useful in the formation of galled joints in cases where the joints are not necessarily well-fitting. The four greased-based compositions were tested on real joints, and were all found to be useful. The other compositions were not actually tested in a joint-making exercise but instead on a simple friction test rig, to see what degree of increased friction they caused between two standard metal surfaces (this has been found to be a good indicator of whether a composition will be useful in a real joint).

The Real Joint Test—A Metal Shaft is Binded into a Bore

Each of four 80 mm long mild steel shafts was accurately turned to 18 mm diameter with a surface roughness of 5 micrometer Ra. Four matching bores were each turned in a 16 mm deep hub made from a parted-off section of 44×44 mm square section mild steel bar, two to a diameter of 18.10 mm, two to 18.20 mm (giving clearances of 0.1 and 0.2 mm respectively), and to a roughness of 7 micrometer Ra. With these shaft/bore dimensions each hub could move freely along its shaft.

For each bar/hub combination the chosen composition under test was then coated onto a centre section of the bar, and the hub moved into that section; the thickness of the composition prevented the free hub/shaft movement, and a vice was used to force the hub into place.

The hub/shaft combination was then torque tested (the hub was twisted around the shaft, measuring the forces involved). Up to some initial torque value (see Table II below:), typically around 40 Nm, the joint resisted, and then it slipped. It was then forced through 50°, and as it was so the slip torque increased to above 500 Nm (as galling occurred, and the hub binded onto the shaft). As the applied torque was increased above that value the shaft yielded, showing that in this case a binded joint could be made between two ill-fitting parts that was actually stronger than the weaker of the two parts itself.

two metal rods one of which had been provided with a thin layer of the composition and was drawn by the rig across the other against the frictional forces.

The test rig comprised two touching 12 millimeter mild steel rods drawn one across the other, using a Hounsfield tensometer (equipped with a 75 Newton calibrated beam) to determine the force necessary (and thus to give an indication of the friction involved). The load between the rods was 91 Newton (selected to give an average contact area of 0.35 $mm^2$ at a yield pressure of 250 Newton/$mm^2$), and after each test the scuffed contact area—the scarring of one rod's surface by the other's as galling took place—was measured. From the knowledge of the applied load and tensometer—shown tangential force there could be calculated the coefficient of friction (mu, or $\mu$), and from a knowledge of the forces involved when no composition was used there could be found the additional friction—delta mu, or $\delta\mu$—caused by the composition.

The several compositions gave results which are also shown in Table I above, from which it will be seen that the average increment in the coefficient of friction was around 0.3 to 0.5.

This particular test showed clearly that while the compositions without the thickener did work, nevertheless they were not nearly as stable as the thickened compositions, which resisted far better the tendency of the siloxane components to leach out and spread over the relevant surfaces. There was observed a tendency for the compositions with the least amounts of thickener to "leak" siloxane, as might be expected.

The thickened compositions seemed to have thixotropic properties—that is, they behaved like stiff pastes when stationary and unstressed, but became much more liquid, and so flowed more easily, when pushed around (many modern paints exhibit this behaviour). This is characteristic of the fumed silica thickener, and is thought to be desirable, both in order to have the composition stay where it is when applied and also to allow it to spread, and "release" the siloxane galling agent component, when squeezed between the parts of the joint to be binded together.

TABLE II

| Comp'n No: | Joint gap (mm) | Initial Torque | Torque at 30° slip | Torque at 50° slip | Torque at 70° slip | Torque at 90° slip |
|---|---|---|---|---|---|---|
| 11 | 0.1 | 25 | 170 | 272 | 375 | 440 |
| 12 | 0.1 | 36 | 240 | 425 | 540 | shaft. sheared |
| 13 | 0.2 | 32 | 210 | 390 | 450 | 580 |
| 14 | 0.2 | 40 | 280 | 560 | shaft . . . sheared | |

(in this Table all the torque measurements are in Newtons/meter).

The Friction Test

Each of the several compositions described above was tested on a rig according to a simple friction test between

I claim:

1. A composition which is effective in the making of a galled joint between two metal members, and specifically in the filling of possible gaps in the joint prior to and during its formation, which composition comprises a multiplicity of small metal particles and a gall-enhancing material.

2. A composition as claimed in claim 1, wherein the particles are of two or more different metals with different hardness.

3. A composition as claimed in claim 1, wherein the particles are of two or more different sizes.

4. A composition as claimed in claim 1, wherein the particles are in shape a mixture of spherical, pear-shaped and elongate particles.

5. A composition as claimed in claim 1, wherein the particles are made of mild or stainless steel, or of tool steel.

6. A composition as claimed in claim 5, wherein the steel has properties such that the steel work hardens when undergoing deformation.

7. A composition as claimed in claim 1, wherein the gall-enhancing agent is a polydimethylsiloxane or a polymethylhydrogensiloxane.

8. A composition as claimed in claim 7, wherein the gall-enhancing agent is a polydimethylsiloxane which includes amino active side groups.

9. A composition as claimed in claim 1, wherein the particles are coated with the gall-enhancing material.

10. A composition as claimed in claim 1, wherein the metal particles are spherical or substantially spherical in shape, slightly pear-shaped, of elongate shape, or rod-shaped.

11. A composition as claimed in claim 1, wherein the particles are spherical or substantially spherical in shape.

12. A process for the preparation of a composition comprising a multiplicity of small metal particles dispersed in a gall-enhancing material, the composition being in the form of a paste and including a thickener, in which the process there are admixed the said metal particles, the gall-enhancing material, and said thickener.

13. In a method of securing against lateral motion two bodies held in face to face asperity contact, thereby to make a join between the two bodies, in which method there is inserted into the interface between the two bodies a composition that on minimal initial lateral relative motion of the two surfaces promotes rapid but controllable "galling" between the two surfaces, this galling binding the surfaces against further such motion, the improvement comprising inserting into the interface between the two bodies a composition comprising a multiplicity of small metal particles and a gall-enhancing material.

14. A method as claimed in claim 13, in which there tends to be formed a gap between the two surfaces and in which up to half of the composition's particles are as hard as the hardest body and have a dimension of at least half the mean gap between the surfaces to be bound.

15. A method according to claim 14 wherein the composition includes also a thickener and is in the form of a paste.

16. A method according to claim 15 wherein the metal particles in the composition are spherical or substantially spherical in shape, slightly pear-shaped, of elongate shape, or rod-shaped.

17. A method according to claim 16 wherein the metal particles are spherical or substantially spherical in shape.

18. A composition as claimed in claim 1, wherein the composition includes also a thickener and is in the form of a paste in which the particles are dispersed in the gall-enhancing material.

19. A composition as claimed in claim 18, wherein the metal particles are spherical or substantially spherical in shape, slightly pear-shaped, of elongate shape, or rod-shaped.

20. A composition as claimed in claim 18, wherein the thickener is fumed silica, in an amount of from 2 to 5 wt % of the gall-enhancing agent.

* * * * *